C. Hoagland,
Cultivator.
No. 75,911. Patented Mar. 24, 1868.
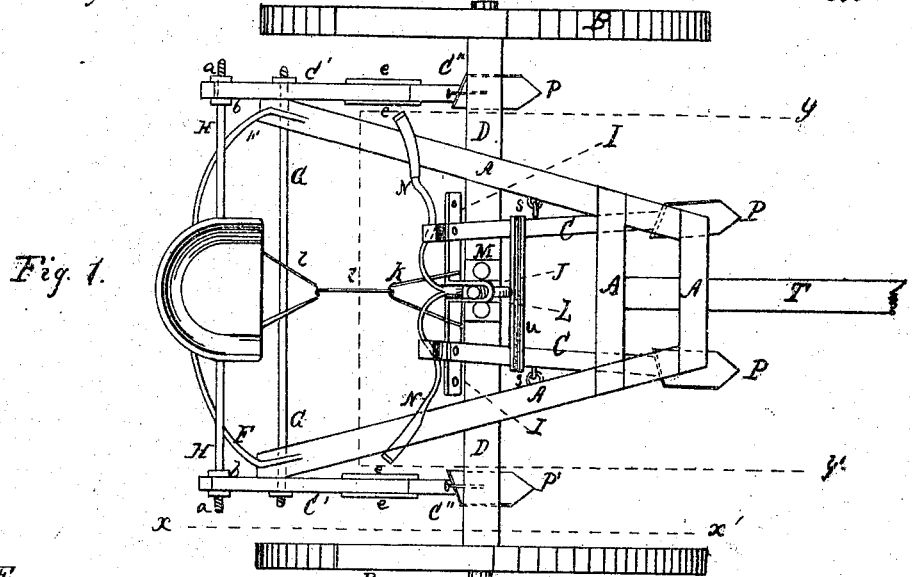
Fig. 1.
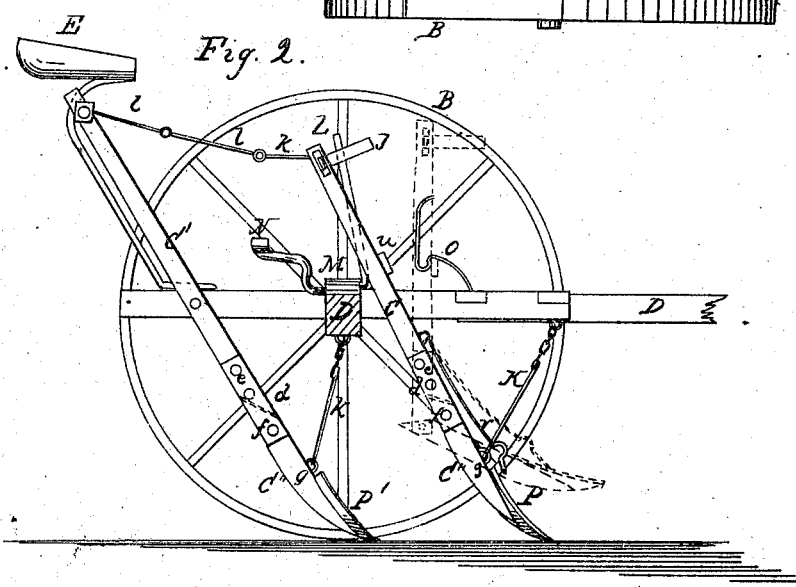
Fig. 2.
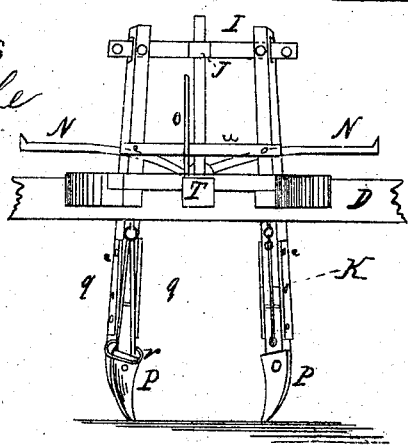
Witnesses
Theo Tasche
W. Trewin
Inventor:
C. Hoagland
Per Munn & Co
Attorneys

United States Patent Office.

CHRISTOPHER HOAGLAND, OF DELAVAN, ILLINOIS.

Letters Patent No. 75,911, dated March 24, 1868.

IMPROVEMENT IN CULTIVATORS.

The Schedule referred to in these Letters Patent and making part of the same.

TO ALL WHOM IT MAY CONCERN:

Be it known that I, CHRISTOPHER HOAGLAND, of Delavan, in the county of Tazewell, and State of Illinois, have invented a new and improved Cultivator; and I do hereby declare that the following is a full, clear, and exact description thereof, which will enable others skilled in the art to make and use the same, reference being had to the accompanying drawings forming part of this specification.

Figure 1 is a top view of my cultivator.

Figure 2 is a vertical section of the same, through the line $x\ x$, fig. 1.

Figure 3 is a detail view of the front ploughs and parts within the line $y\ y'$, fig. 1.

Similar letters of reference indicate corresponding parts.

This invention relates to the improvement of cultivators by jointing the standards bearing the ploughs, and attaching links to the same, so that the former can be raised clear of the ground when desired, together with other devices improving and perfecting the whole.

T is the tongue. A is the general frame of the cultivator, having the swinging standards C attached to it, with eye-bolts, as shown at S, whereby the said standards are allowed a partial vibration on their centres of attachment in any direction. B B are the wheels, and D the axle, supporting the frame A. E is the seat, supported by arched iron rods F, secured to the frame A. The rear standards C' C' are held to the frame by a transverse rod, G, and have only a forward and backward vibration. Another rod, H, passes through their upper ends, and holds them steady by means of nuts $a$ and washers $b$. A rod, I, bent, as shown at J, is pivoted in mortises in the upper ends of the standards C C, for a purpose to be shown. This rod is provided with two or more holes for adjusting the spread of the said standards. This rod is further provided with a V-shaped link, K, to which is attached a link or rod, $l$, connecting it with the rod H, for a purpose to be explained. The lower ends of all the standards are jointed at $d$ by means of side-plates $e$, bolted to the upper parts, and having a single bolt, $f$, passing through each one of the lower parts C'', whereby the latter are hinged to the upper parts. The proximate ends of the two parts are formed with a corresponding angle, as shown by the dotted line, by means of which, when brought in line, the said parts will be held stiffly. The object of this joint or hinge is to allow the ploughs to be brought forward and raised clear of the ground when desired. This is accomplished by the attachment of links K to eye-bolts $g$, near the ploughs; the other ends of said links being similarly attached to the frame A at some part forward of the ploughs. The driver, when desiring to raise the ploughs P P' clear of the ground, presses the upper ends of the standards C forward with his feet. The links K of the said standards raise the ploughs P P, as shown by the red outline in fig. 2. The connecting-link $l$ also brings forward the rear standards C' C', and their links K in like manner raise the ploughs P' P'. The lateral vibration of the front standards C C has for its object the avoiding of irregular hills of corn or other growth, by deviating the ploughs P to the right or left of such irregular hills when encountered. This lateral movement is given to the ploughs by the driver by means of an upright rod L resting in the bend J of the cross-rod I. This upright, L, is bent at a right angle, one part of which passes loosely under a plate, M, bolted on to the axle D, as shown in figs. 1 and 2. This upright, L, is thus permitted a lateral vibration. After passing under the plate M, the said rod bifurcates into two arms N, which are flattened and turned up at their ends to form a rest or pedal for the driver's foot, as shown at figs. 1 and 3. By pressing down either one of these pedals, the upright, L, be means of its location in the bend J, moves the standards C, and consequently the ploughs P, to the right or left, as before mentioned. A spring, O, fastened to the frame, and bent in the form of a catch, as shown at figs. 2 and 3, catches on to a cross-piece, $u$, pivoted on to the standards C' C', and holds all the standards forward, and consequently the ploughs P P' above the ground, for the purpose before shown. To each standard is fastened a scraper, $r$, formed of two parts $q\ q$, one of which is on each side of the links K, which thus keeps it in place. At their ends, and resting on the front of the ploughs, is the scraping-edge $r$ for cleaning the plough-points when clay or stiff soil is collected thereon. When the ploughs are raised out of the ground in the manner before shown, this edge $r$ bears upon and passes along the face of the plough as the same is raised, thus scraping it clear. The links K serve to take a portion of the strain from the standard joints $d$ when ploughing.

This form of cultivator presents many advantages over those now in use, being light of draught, simple, efficient, easily operated, of small cost, and little likely to get out of repair.

I claim as new, and desire to secure by Letters Patent—

1. The combination of the jointed plough-standards C C', plates d, links K, scrapers r, and connecting-links l k, as herein described, for the purpose specified.

2. The links l k, or other equivalent device, for connecting the front and rear standards, for the purpose of operating the latter simultaneously with the former, substantially as shown and described.

3. The plates d, with their bolts f, or other equivalent device, for forming a hinge between the standards C C' and ploughs P P', substantially as shown and described.

4. The spring-catch O, or its equivalent, for holding the standards forward, substantially as and for the purpose shown and described.

5. The rod L, for vibrating the standards C laterally, substantially as shown and described 6. The arms N, for operating the rod L, substantially as shown and described.

7. The rod I, with its bend J, or other equivalent device, substantially as and for the purposes shown an described.

8. The laterally-vibrating standards C, in combination with the rod L and bend J, substantially as and for the purposes shown and described.

9. The plough-cleaner r, or other equivalent device, attached and working substantially as shown and described.

CHRISTOPHER HOAGLAND.

Witnesses:
SAMUEL LAWTON,
W. J. SCOTT.